March 27, 1934.  F. LUX  1,952,763
TIMING MECHANISM
Filed Sept. 30, 1929  2 Sheets-Sheet 1
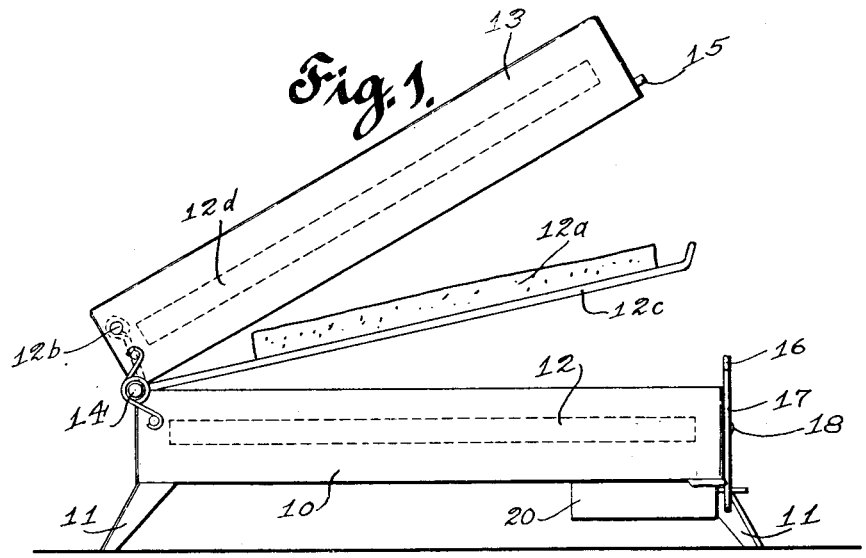
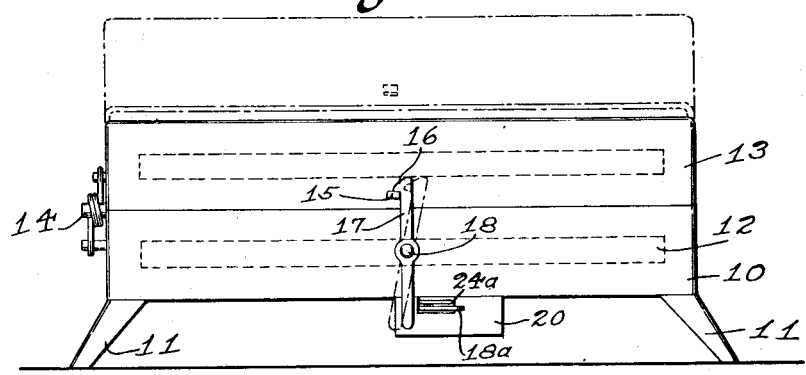
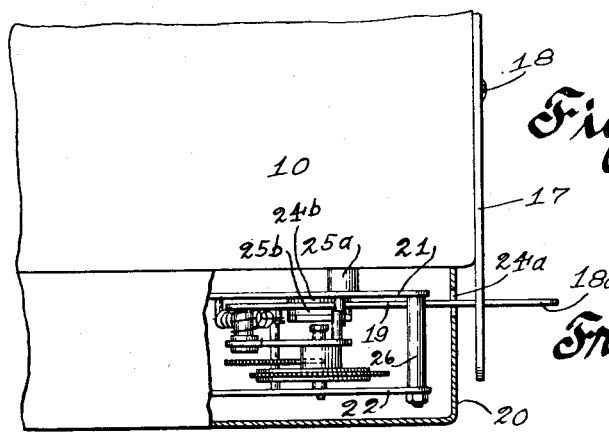
INVENTOR
Frederick Lux
BY
H. G. Manning
ATTORNEY

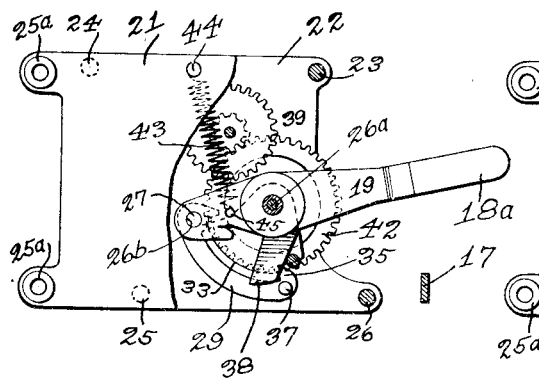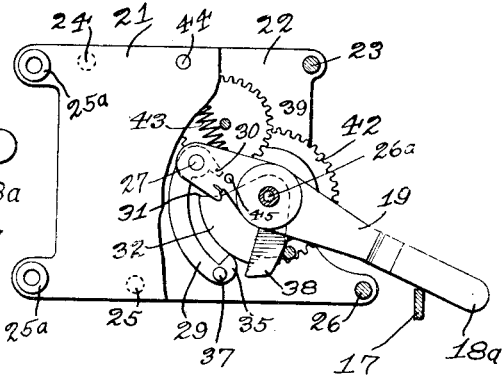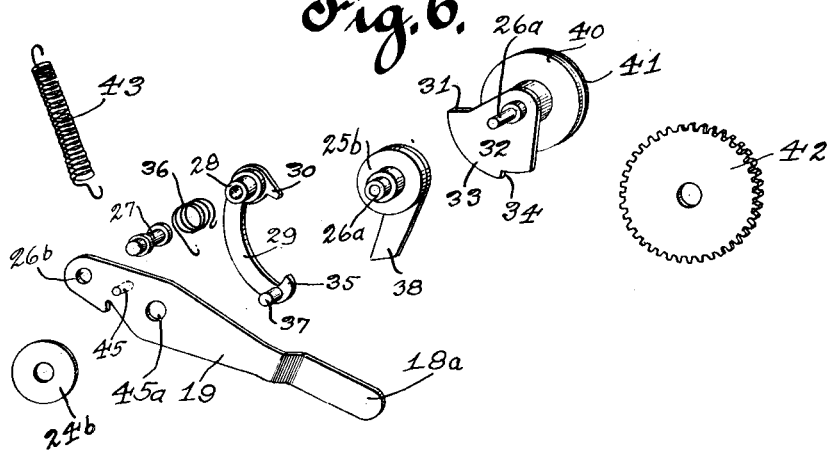

Patented Mar. 27, 1934

1,952,763

UNITED STATES PATENT OFFICE 1,952,763

TIMING MECHANISM

Frederick Lux, Waterbury, Conn., assignor to The Lux Clock Manufacturing Company, Incorporated, Waterbury, Conn., a corporation of Connecticut Application September 30, 1929, Serial No. 396,093

5 Claims. (Cl. 161—1)

This invention relates to timing devices, and more particularly to a device for starting or terminating photographic, X-ray treatment, and cooking operations, the giving of alarms, the operation of switches, etc.

One object of this invention is to provide a timing mechanism which is adapted to restrain the operation for any predetermined interval of time after which the operation is suddenly effected.

A further object is to provide a timing device of the above nature having manually operated means for setting it to operate at any desired predetermined time.

A further object is to provide a device of the above nature which will be simple in construction, inexpensive to manufacture, easy to manipulate, compact, and very efficient and durable in use.

With these and other objects in view there has been illustrated on the accompanying drawings one form in which the invention may be conveniently embodied in practice.

The invention is herein illustrated as applied to an automatic electric toaster, in which a toast-carrying member is adapted to be withdrawn from the heating elements after any desired interval.

Fig. 1 represents a side view of an automatic toaster upon which the present invention has been installed, said toaster being shown in open position.

Fig. 2 is a front view of the same with the toaster shown in closed position.

Fig. 3 is a fragmentary front view of the toaster on an enlarged scale, the timing mechanism being shown partly in section.

Fig. 4 is a fragmentary top view of the timing mechanism as it appears when the releasing lever is in inoperative position.

Fig. 5 is a view of the same similar to Fig. 4, but with the releasing lever shown in engagement with the cover latch.

Fig. 6 is a view in spaced relation of the various parts of the timing mechanism.

The present application is a continuation in part of a prior application by the same inventor filed April 19, 1928, Ser. No. 271,341, patented November 12, 1929, No. 1,735,540.

Referring now to the drawings in which like reference numerals denote corresponding parts throughout the several views, the invention comprises a base section 10, preferably rectangular in plan view, and supported by four inclined legs 11 arranged at the corners thereof. The base section 10 is adapted to carry a toasting element 12 heated by electricity from any convenient source, not shown.

In order to support the food being toasted, such as a slice of bread 12a, provision is made of a wire carrier member 12c hinged on a fulcrum 12b in a cover member 13. The cover member 13 is connected at one end to the base 10 by a spring hinge 14 adapted to hold said cover member in the open position shown in Fig. 1 when the toaster is out of use. The cover member 13 is provided with a heating element 12d similar in all respects to the heating element 12.

In order to detachably hold the toaster in the closed operating position, shown in Fig. 2, the cover member 13 is provided on its free edge with a projecting latch 15, which is adapted to be engaged by a hook 16 on the upper end of a catch lever 17, which is pivoted at 18 on the forward edge of the base member 10. The bottom end of the catch lever 17 is adapted to extend below the base member 10 into alinement with an offset extremity 18a of a release lever 19 forming part of a timing mechanism housed within a casing 20.

In operation, when the bread or other article of food is being toasted, the hook 16 of the catch lever 17 will overlie the latch 15 and will hold the cover in its lowermost or closed position, as shown in full lines in Fig. 2. When the article of food has been toasted sufficiently, however, the operation of the timing mechanism will force the release lever 19 laterally, which in turn will move the bottom of the catch lever to the left, as shown in dotted lines in Fig. 2, permitting the cover 13 to spring open and separate the toast-carrying member from the heating elements 12 and 12d.

The timing mechanism, as most clearly shown in Figs. 4 to 6, comprises a pair of plates 21 and 22 connected together by corner posts 23, 24, 25, and 26, the plate 21 being secured to said base 10, as by a plurality of screw studs 25a. The releasing lever 19 passes inwardly through a slot 24a of the casing and is loosely mounted upon the reduced end of a stepped collar member 25b, being spaced from the plate 21 by a washer 24b. The collar 25b is rigidly secured in the plate 21.

The end of the release lever 19 opposite from the offset extremity 18a is provided with an aperture 26b within which is mounted a pin 27 surrounding which is a collar 28, forming part of an escapement pawl member 29. The pawl member 29 is provided on its rear end with a pointed tooth 30 which underlies the collar 28 and is adapted to engage a shoulder 31 on a movable catch plate 32, said catch plate being rotatable on a loosely journaled shaft 26a and having a curved outer edge 33. At the opposite end of the curved edge 33 from the shoulder 31 the catch plate 32 has a locking recess 34 for receiving a tooth 35 located on the free end of the pawl member 29.

The pawl member 29 is adapted to be pressed in a counter-clockwise direction by means of a coiled wire spring 36, as clearly shown in Fig. 6. The escapement pawl member 29 is provided adjacent the tooth 35 with an outwardly projecting pin 37 adapted to be engaged by a cam member 38 preferably frictionally connected with said collar member 25b. The cam member 38 by reason of its engagement with said pin 37 will cause the tooth 35 to be raised out of the locking recess 34 whenever the catch plate 32 has ben rotated to the releasing point by the pawl member 29, which is driven by a spring 43 under the control of a standard time train generally indicated by the numeral 39.

In order to permit the release lever 19 to be turned in either direction to the desired setting without disturbing the time train, the catch plate 32 is provided with a pair of spaced friction plates 40 and 41 which are adapted to press against opposite faces of a main gear wheel 42 forming part of the time train 39. The friction between the plates 40 and 41 and the wheel 42 is made sufficient to transmit power to the time train 39 from the catch plate 32 and pawl member 29, causing said catch plate to rotate slowly under the driving force of the spring 43, which furnishes the power for operating said time train. The spring 43 is connected at one end to a pin 44 carried by the plate 21, and at its other end to a pin 45 mounted on the releasing lever 19 between a hub aperture 45a and the aperture 26b.

When it is desired to "set" the timing mechanism, it will only be necessary to swing the release lever 19 upwardly by means of its projecting handle 18a from the position shown in Fig. 5 to that of Fig. 4. During this operation, the tooth 35 of the escapement pawl 29 will first ride over the curved surface of the catch plate 32 and will be forced by the spring 36 into the locking recess 34 of said plate. Further movement of the release lever will bring the rear tooth 30 of the pawl 29 into engagement with the shoulder 31 on the catch plate 32, causing the latter to be rotated to the predetermined "set" position. During this rotation the friction plates 40 and 41 will slip over the surface of the main gear wheel 42 which is held against rotation itself by the clock train 39.

It will be understood that after setting the timing mechanism as above described, the article to be toasted will be inserted in the carrying member 12c, and the cover 13 forced downwardly from the position shown in Fig. 1 to the full-line position shown in Fig. 2. During this operation the latch 15 will engage the inclined surface 16 of the hook 17 and force the latter in a clockwise direction toward the dotted line position shown in Fig. 2. The hook 17 may then be locked by manually forcing it back to the full line position shown in Fig. 2. It will of course be understood that if desired, spring or gravity means, not shown, may be employed for causing the automatic locking of the hook 17 upon the latch 15.

It will also be understood that in the operation of the timing mechanism, the release lever 19 will at first be moved slowly under the control of the time train 39 until the cam 38 comes into engagement with the pin 37 on the escapement pawl 29, which will occur just before the expiration of the predetermined time interval. The front tooth 35 of the pawl 29 will shortly thereafter be lifted and disengaged from the locking recess 34 of the catch plate 32 by further running of the timing train. This will permit the helical spring 43 to instantly move the releasing lever 19 the remaining distance back to its original lowermost position, causing it to engage the lower end of the catch lever 17 and release the cover 13, which thus will be allowed to swing upwardly to open position.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new and for which it is desired to secure Letters Patent, is:

1. In a timer, a time-keeping mechanism, a combined setting and spring driven lever, a spring-pressed pawl having teeth at its opposite ends pivotally connected to said lever, a catch plate having a pair of shoulders for engagement by said teeth respectively, said catch plate having a frictional slipping connection with said time-keeping mechanism, one tooth of said pawl engaging one shoulder when the timer is being set, a fixed cam located in the path of the other tooth to release said pawl from engagement with said catch plate, whereby said lever will thereafter be permitted to move unopposed by said time-keeping mechanism to effect a desired operation.

2. In a timer, a time-keeping mechanism, a driven lever, a pawl pivoted to said lever and having a pair of teeth, a catch plate having a pair of shoulders for releasable engagement with the teeth of said pawl respectively, the power from said lever being transmitted through one tooth to said time-keeping mechanism, a fixed cam in the path of said tooth to release said pawl from engagement with said catch plate, whereby said lever will thereafter be permitted to move unopposed by said time-keeping mechanism to effect a desired operation, said catch plate being frictionally connected to said time-keeping mechanism, said catch plate being moved to "set" position by the other tooth when said lever is moved in the opposite direction.

3. In a timer, a time-keeping mechanism, a driven lever, a catch plate having two shoulders frictionally connected to said time-keeping mechanism, a double-toothed pawl carried by said lever, one tooth of said pawl engaging one shoulder when said lever is moved in one direction to set the timer, the other tooth engaging the other shoulder for transmitting the power from said lever to said catch plate, a fixed cam in the path of said pawl to release the other tooth from engagement with said catch plate whereby said lever will thereafter be permitted to move unopposed by said time-keeping mechanism to effect a desired operation.

4. In a timer, a time-keeping mechanism, a driven lever, a double-toothed pawl pivoted at one end to said lever, a catch plate frictionally connected to said time-keeping mechanism and having a pair of shoulders for releasable engagement with the teeth of said pawl respectively, one tooth engaging one shoulder when the lever is being set, the other tooth engaging the other shoulder for transmitting the power from said lever to said catch plate, a fixed cam in the path of said pawl to release said other tooth from engagement with said catch plate whereby said lever will thereafter be permitted to move unopposed by said time-keeping mechanism to effect a desired operation.

5. In a timer, a time-keeping mechanism, a driven lever, a pawl pivoted at one end to said lever and having a tooth at its free end, a movable catch plate frictionally connected to said time-keeping mechanism and having a shoulder for releasable engagement with said tooth for transmitting the power from said lever to said time-keeping mechanism, a cam in the path of said pawl to release said pawl from engagement with said catch plate, whereby said lever will thereafter be permitted to move unopposed by said time-keeping mechanism to effect a desired operation.

FREDERICK LUX.